United States Patent Office 3,526,637
Patented Sept. 1, 1970

3,526,637
ALKYL AND ALKENYL PHENOXYALKYL
AMINO COMPOUNDS
Eugene L. Wittle, Ann Arbor, Mich., assignor to Parke,
Davis & Company, Detroit, Mich., a corporation of
Michigan
No Drawing. Filed Apr. 14, 1967, Ser. No. 630,820
Int. Cl. C07d 27/04; C07c 93/06
U.S. Cl. 260—326.5
5 Claims

ABSTRACT OF THE DISCLOSURE

Olefinic and saturated phenoxyalkylamine compounds, such as, for example, 1-{{2-{p-[2-ethyl-1,3-bis(p-methoxyphenyl)-3-butenyl]phenoxy}ethyl}}pyrrolidine and 1-{{2-{p-[2 - ethyl - 1 - (p-methoxyphenyl) - 3 - phenylbutyl]phenoxy}ethyl}}pyrrolidine and salts thereof, useful as pharmacological agents having hypocholesteremic and anti-fertility activity, and their production by (a) dehydration of a hydroxyl-containing precursor; (b) hydrogenation of an olefinically unsaturated precursor; and (c) hydrogenation of a carbonyl-containing precursor.

SUMMARY AND DETAILED DESCRIPTION

The present invention relates to new amine compounds that are useful as pharmacological agents and to methods for their production. More particularly, the invention relates to new phenoxyalkylamine compounds having in free base form the formula

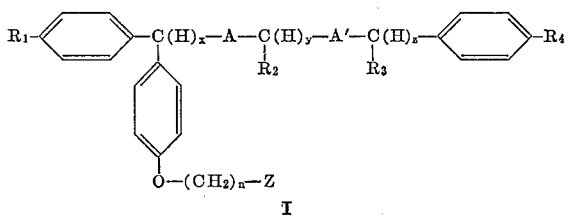

I and to pharmaceutically-acceptable acid-addition salts thereof; where each of $R_1$ and $R_4$ is hydrogen or methoxy; $R_2$ is hydrogen or lower alkyl; $R_3$ is hydrogen, methyl, ethyl, methylene, or ethylidene; Z is di(lower alkyl)amino or 1-pyrrolidinyl; $n$ is a positive integer having a value of 2 or 3; each of $x$, $y$, and $z$ has a value of zero or one; and each of A and A' represents a single bond or a double bond; with the further provisos that (a) when $R_3$ is methylene or ethylidene, both A and A' represent single bonds; and (b) when one of A and A' is a double bond, the other is a single bond. It will be apparent from the foregoing that the values of $x$, $y$, and $z$ are dependent upon A, A', and $R_3$ in such a way so that in each case the full tetravalency is satisfied of each of the carbon atoms to which are attached the hydrogen atoms delimited by $x$, $y$, and $z$. The lower alkyl radical represented by $R_2$ is a monovalent alkyl radical having not more than four carbon atoms.

In accordance with the invention, phenoxyalkylamine compounds having Formula I above, wherein there is contained one olefinic double bond, and acid-addition salts thereof, are produced by heating an acid-addition salt of a compound having the formula

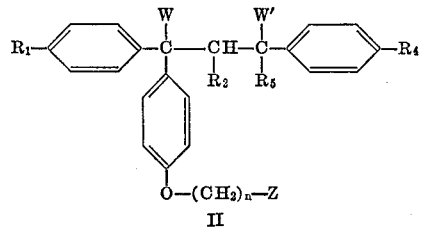

II where $R_1$, $R_2$, $R_4$, $n$, and Z all have the aforementioned significance; $R_5$ is hydrogen, methyl, or ethyl; and one of W and W' is hydrogen and the other of W and W' is hydroxyl. The heating results in the dehydration of the compound of Formula II and the consequent formation of an olefinic double bond. This dehydration process is preferably and most conveniently carried out in the absence of any solvent. If desired, however, an unreactive high-boiling solvent, such as the mixture of diphenyl and diphenyl oxide known commercially by the trademark, Dowtherm A, or the isometric terphenyl mixture known by the trademark, Dowtherm C, may be used. The acid-addition salts that may be used as starting materials are those formed between the amine free base compound of Formula II and a moderately strong organic or inorganic acid. Some examples of such salts that are suitable are the hydrochloride, hydrobromide, oxalate, and trichloroacetate. Of these, the hydrochloride is highly preferred. Salts formed with strong inorganic acids, such as sulfuric, nitric, and phosphoric are not desirable and should not be used. The reaction is best carried out at an elevated temperature, that is, above 150° C., and a preferred temperature is one in the range of from 190–220° C. When no solvent is used, the dehydration is promoted and decomposition of the reaction mixture is minimized by carrying out the heating under reduced pressure, that is, at a pressure of about 1 to 25 mm. Hg. The time required for completion of the dehydration will naturally vary depending on the temperature and amount of starting material employed. A period of from 15 minutes to one hour is generally sufficient. Upon completion of the dehydration, the reaction product is obtained in the form of an acid-addition salt. It can be isolated in this form, or, preferably, can be converted by treatment with dilute aqueous alkali to the free base, which can be purified further by chromatography on alumina, and then reconverted into an acid-addition salt by reaction with an appropriate acid, such as citric or hydrochloric acid.

In the preferred method for carrying out the foregoing dehydration, the preferred hydrochloride salt starting material is prepared in situ by treating the chosen free base having Formula II with excess concentrated hydrochloric acid in a mixture of benzene and water. The resulting mixture is then distilled under reduced pressure (about 15 mm. Hg) at a temperature between about 60 and 100° C. until no more distillate is obtained, and the residue is heated at 190–220° C. for 15 to 60 minutes under reduced pressure (about 15 mm. Hg). The reaction product is then isolated as described above.

The free base compounds having Formula II above that are used in the foregoing process can be prepared in a variety of ways as will appear in greater detail hereinafter. For example, a substituted benzaldehyde compound having the formula

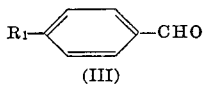

(III)

is reacted with a phenyl alkyl ketone having the formula

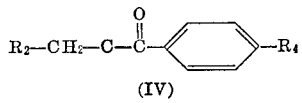

(IV)

to give a substituted chalcone compound having the formula

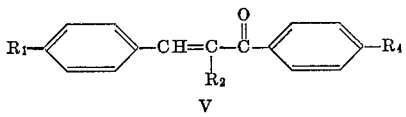

V which is reacted with a substituted phenyl magnesium halide compound having the formula

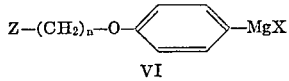

VI followed by hydrolysis of the reaction product, and the product obtained, having the formula

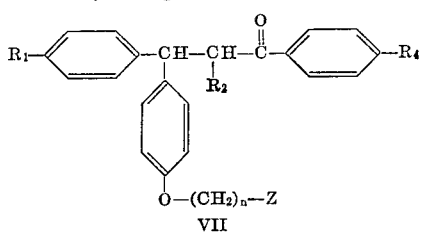

VII is either reduced by reaction with lithium aluminum hydride, followed by hydrolysis of the reaction product, or reacted with an alkyl magnesium halide compound having the formula $$R_6—CH_2—M_gX$$

VIII again followed by hydrolysis of the reaction product to give, in either case, a compound having Formula II wherein W' is hydroxyl, W is hydrogen, and $R_1$, $R_2$, $R_4$, $R_5$, $n$, and Z are all as defined earlier. In Formula VIII above, $R_6$ is hydrogen or methyl.

Also in accordance with the invention, phenoxyalkylamine compounds having the formula

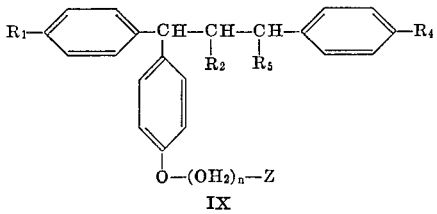

IX and acid-addition salts thereof are produced by reacting a phenoxyalkylamine compound having Formula I above, wherein there is contained one olefinic double bond, or an acid-addition salt thereof, with gaseous hydrogen in the presence of a hydrogenation catalyst; where $R_1$, $R_2$, $R_4$, $R_5$, $n$, and Z have the same meaning as previously given. Hydrogenation catalysts that may be used include Raney nickel and noble metal catalysts, such as platinum, platinum oxide, palladium, palladium oxide, and rhodium, which may optionally be supported on an inert carrier, such as carbon. The preferred hydrogenation catalyst is platinum oxide. The reaction is best carried out in a solvent medium. Some examples of suitable solvent media that may be used are acetic acid, lower alkanols, water, and various mixtures of these. With the preferred platinum oxide catalyst, acetic acid is the solvent of choice. With Raney nickel, water or an aqueous mixture of a lower alkanol is preferred. The temperature is not critical, and the reaction is conveniently carried out at room temperature. The duration of the reaction will vary, depending somewhat upon the temperature, hydrogen pressure, and amount of olefinic starting material, and is best determined by monitoring the adsorption of hydrogen during the course of the reaction. The reaction is complete when one molecular equivalent of hydrogen has been taken up. The hydrogenation is best accomplished by employing hydrogen at an initial pressure of from about 2 to about 10 atmospheres.

Further in accordance with the invention, phenoxyalkylamine compounds having the formula

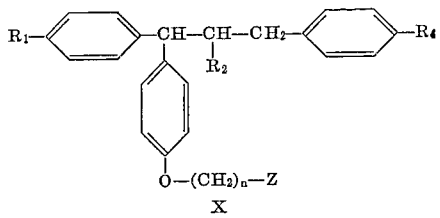

X and acid-addition salts thereof are produced by reacting a compound having Formula VII above, or an acid-addition salt thereof, with gaseous hydrogen in the presence of a hydrogenation catalyst; where $R_1$, $R_2$, $R_4$, $n$, and Z have the same meaning as previously given. The preferred catalyst for use in this hydrogenation reaction is palladium-on-carbon. The reaction is advantageously carried out in a solvent medium. The preferred solvent medium is a mixture of a lower alkanol and a mineral acid, for example, sulfuric or hydrochloric acid. Glacial acetic acid may also be used as solvent. The temperature and duration of the reaction are not critical and may be varied widely. The reaction is conveniently carried out at room temperature for a period sufficiently long to allow 2 molecular equivalents of hydrogen to be taken up. An initial hydrogen pressure of from about 2 to about 10 atmospheres may be used.

The compounds of the invention can exist in the free base form having Formula I or in the form of one of their acid-addition salts with a variety of inorganic or organic acids. Some representative non-toxic, pharmaceutically acceptable acid-addition salts are the hydrochloride, hydrobromide, hydroiodide, sulfate, phosphate, acetate, citrate, tartrate, benzoate, benzenesulfonate, and succinate. When it is desired to employ the compounds of the invention in acid-addition salt form, the salts may be obtained as described above or by reacting the selected base with the selected acid in an unreactive solvent medium. The acid-addition salts can be converted to the free bases by reaction with a base such as potassium carbonate or sodium hydroxide. The free base compounds and their acid-addition salts may differ with respect to certain properties, such as solubility, but are otherwise equivalent for purposes of the invention.

The compounds of the invention are new chemical compounds that are useful as pharmacological agents. They are hypocholesteremic agents that are active in producing a fall in the level of blood cholesterol. They are also active as anti-fertility agents. While they are active upon either oral or parenteral administration, oral administration is preferred. The compounds of the invention can be employed in either free base or acid-addition salt form, and can be combined with either a solid or liquid carrier or diluent and made available in varying amounts in such pharmaceutical forms as tablets, capsules, powders, and aqueous and nonaqueous suspensions and solutions.

The compounds of the invention are normally obtained as mixtures of stereoisomers. In a number of cases, the product obtained from the dehydration reaction described above is a mixture of two olefinic compounds, the position of the double bond in each depending on the manner in which the dehydration occurs. It has been found that such mixtures are useful for purposes of the invention, and, in general, no special attempt has been made to isolate the individual isomers. In some cases, it is possible to determine the composition of such mixtures of olefins by using nuclear magnetic resonance spectroscopy techniques. In the preparation of the free base compounds having Formula I in which there is no double bond or in which both A and A' are single bonds, the products are obtained as mixtures of diastereoisomers. If desired, these mixtures can be resolved by employing chromatographic techniques on various adsorbents, such as alumina, silica gel, and activated magnesium silicate (Florisil), to give pairs of diastereoisomers.

The invention is illustrated by the following examples.

EXAMPLE 1

A mixture consisting of 18.5 g. of 1-(p-methoxyphenyl)-1-[p-[2-(1-pyrrolidinyl)ethoxyl]phenyl]2-phenyl - butan-3-ol, 100 ml. benzene, 20 ml. of water, and 10 ml. of concentrated hydrochloric acid is evaporated at 80–100° C. at 15 mm. Hg until no more distillate is obtained, and the residue is heated for 30 minutes at 190° C. while the pressure is maintained at 15 mm. Hg. Upon cooling, the reaction mixture is dissolved in 100 ml. of warm acetone, the acetone solution is treated with a mixture consisting of 250 ml. of ether, 50 ml. of methylene chloride, and 50 ml. of benzene, and the resulting mixture is made alkaline by thoroughly shaking it with 5% aqueous sodium hydroxide. The organic solution is then washed with four 50-ml. portions of water, dried, and evaporated to dryness to yield an oily residue that is a mixture consisting approximately 80% of 1-{{2-{p-[1-(p-methoxyphenyl)-3-phenyl-2-butenyl]phenoxy}ethyl}}pyrrolidine and approximately 20% of 1-{{2-{p-[1-(p-methoxyphenyl)-3-phenyl-3-butenyl]phenoxy}ethyl}}pyrrolidine.

This oily residue (14 g.) is mixed with 8 g. of citric acid monohydrate in 50 ml. of methyl ethyl ketone and the resulting mixture is heated on a steam bath until the solids are completely dissolved. After cooling, the mixture is diluted with an equal volume of ether and the solid that precipitates, which is a mixture of 1-{{2-{p-[1-(p-methoxyphenyl) - 3 - phenyl - 2 - butenyl]phenoxy}ethyl}}pyrrolidine monocitrate hemihydrate and 1-{{2{p-[1-(p-methoxyphenyl)-3-phenyl - 3 - -butenyl]phenoxy}ethyl}}pyrrolidine monocitrate hemihydrate, is isolated, dried and crystallized from acetone-ether; M.P. 89–94° C.

The starting material is prepared as follows.

To a slurry of 1 g. of magnesium turnings in 10 ml. of anhydrous tetrahydrofuran is added 1.0 ml. of 1,2-dibromoethane, and then, after the vigorous reaction has subsided, 1.0 ml. of p-[2-(1-pyrrolidinyl)ethoxy]-phenyl bromide is added, and the reaction allowed to continue until no more heat is evolved. An additional small amount (1–2 ml.) of p-[2-(1-pyrrolidinyl)ethoxy]-phenyl bromide is added and again allowed to react completely. This reaction mixture is then added all at once to a slurry of 5 g. of magnesium turnings in 50 ml. of anhydrous tetrahydrofuran, and the resulting mixture is stirred while a solution of 54 g. of p-[2-(1-pyrrolidinyl)-ethoxy]phenyl bromide in 200 ml. of dry tetrahydrofuran is added at such a rate so as to maintain the temperature of the reaction mixture at about 40–60° C. After addition is complete, the mixture is stirred and heated under reflux for 30–60 minutes to complete the reaction.

To the solution of p-[2-(1-pyrrolidinyl)ethoxy]-phenyl magnesium bromide, prepared as described above, is added dropwise a solution of 38 g. of p-anisalacetophenone in 50 ml. of warm tetrahydrofuran, the resulting mixture is stirred and heated under reflux for three hours, and, after standing overnight at room temperature, is treated carefully with 25 ml. of water. The precipitated salts are removed by filtration and washed with 50 ml. of tetrahydrofuran and 50 ml. of methylene chloride. The combine filtrate and washings are evaporated under reduced pressure at 60° C. to remove solvent, and the residue is dissolved in 500 ml. of methylene chloride. This solution is filtered, washed with three 100-ml. portions of water, dried, and evaporated to dryness under reduced pressure to give 3-(p-methoxyphenyl)-3-{p-[2-(1 - pyrrolidinyl)ethoxy]phenyl}propiophenone; M.P. 116–118° C., following crystallization from ether.

To a stirred solution of methyl magnesium bromide (prepared from 24 g. of methyl bromide and 5 g. of magnesium in 150 ml. of anhydrous ether) is slowly added a solution of 21.5 g. of 3-(p-methoxyphenyl)-3-{p-[2-(1-pyrrolidinyl)ethoxy]phenyl}propiophenone in 150 ml. of tetrahydrofuran, and the resulting mixture is distilled to remove solvent until the temperature of the reaction mixture reaches 85° C., at which temperature it is heated under reflux with stirring for 2 hours. After cooling, the reaction mixture is treated carefully with 15 ml. of water, 7.5 ml. of methanol, and 100 ml. of 10% aqueous ammonium chloride, and the resulting aqueous mixture is extracted with 400 ml. of ether. The ether extract is washed with two 50-ml. portions of water, dried, and concentrated to give an oily residue, which is triturated with ether, filtered, and the filtrate evaporated to dryness to give the desired 1-(p-methoxyphenyl)-1-{p-[2-(1 - pyrrolidinyl)ethoxy]phenyl} - 3 - phenylbutan-3-ol starting material, suitable for use without further purification.

EXAMPLE 2

A mixture consisting of 2.5 g. of 1-(p-methoxyphenyl)-1{p - [2 - (1 - pyrrolidinyl)ethoxy]phenyl}-3-phenyl-pentan-3-ol, 25 ml. of benzene, 15 ml. of water, and 3 ml. of concentrated hydrochloric acid is evaporated to dryness at 60–100° C. at 15 mm. Hg, and the residue is heated at 200° C. for 15 minutes while the pressure is maintained at 15 mm. Hg. Upon cooling, the reaction mixture is dissolved in 50 ml. of hot acetone, the acetone solution is poured into a mixture consisting of 150 ml. of ether, 25 ml. of methylene chloride, and 25 ml. of benzene, and the resulting mixture is made alkaline by thoroughly shaking it with 5% aqueous sodium hydroxide. The organic solution is washed with three 50-ml. portions of water, dried, and evaporated to yield an oily residue of 1 - {{2 - {p - [1 - (p - methoxyphenyl)-3-phenyl - 2 - pentenyl]phenyl}ethyl}}pyrrolidine, that is further purified by converting it to a citrate salt, M.P. 80–87° C., according to the procedure described below, treating the salt with excess aqueous base to regenerate the oily free base, and chromatographing the oil obtained on a column prepared from 20 g. of alumina, from which the desired product is obtained by elution with varying mixtures of diethyl ether and hexane and with diethyl ether.

A mixture consisting of 420 mg. of the oily product obtained above, 420 mg. of citric acid monohydrate, and 13 ml. of methyl ethyl ketone is heated on a steam bath until solution is complete, and the resulting solution is cooled and diluted with diethyl ether to precipitate 1-{{2-{p-[1-(p-methoxyphenyl) - 3 - phenyl - 2 - pentenyl] phenoxy}ethyl}}pyrrolidine monocitrate monohydrate, which is isolated and dried; M.P. 80–83° C.

The 1 - (p - methoxyphenyl) - 1 - {p - [2 - (1 - pyrrolidinyl)-ethoxy]phenyl}-3-phenlypentan-3-ol starting material is obtained as follows. To a stirred solution of ethyl magnesium bromide (prepared from 24 g. of ethyl bromide and 6 g. of magnesium in 100 ml. of anhydrous ether) is added dropwise a solution of 5.2 g. of 3-(p-methoxyphenyl) - 3 - {p - [2-(1-pyrrolidinyl)ethoxy] phenyl}propiophenone in 150 ml. of tetrahydrofuran, and the resulting mixture is distilled to remove solvent until the temperature of the reaction mixture reaches 85° C., at which temperature it is heated under reflux with stirring for 6 hours. Upon cooling, the reaction mixture is treated carefully with 10 ml. of water, 5 ml. of methanol, 200 ml. of tetrahydrofuran, and 10 g. of ammonium chloride, and the resulting mixture is stirred for 30 minutes and filtered. The filtrate is evaporated under reduced pressure, and the residue is stirred with 100 ml. of methylene chloride and 50 ml. of 5% aqueous sodium hydroxide. The methylene chloride solution is separated, washed with 50 ml. of water, dried, and evaporated to give the desired starting material as an oil that is suitable for use without further purification.

EXAMPLE 3

Utilizing the procedure described in Example 2 above, from the dehydration of the hydrochloride salt prepared from 7 g. of 3-{α-(p-methoxyphenyl)-p-[2 - (1-pyrrolidinyl)ethoxy]benzyl}-2-phenylpentan-2-ol and excess hydrochloric acid, there is obtained an oily product that is a mixture of 1-{{2-{p-[2 - ethyl - 1-(p-methoxyphenyl)-3-phenyl-2-butenyl]phenoxy}ethyl}}pyrrolidine and 1-{{2-{p-[2-ethyl - 1 - (p - methoxy - phenyl) - 3 - phenyl - 3-butenyl]phenoxy}ethyl}}pyrrolidine. This oily product mixture is subjected to chromatography on a column prepared from 50 g. of alumina, from which, upon elution with, in order, petroleum ether, varying mixtures of petroleum ether and diethyl ether, and diethyl ether, there are obtained the individual olefin components, identifiable by means of their nuclear magnetic resonance spectra.

A solution of 1.16 g. of 1-{{2-{p-[2-ethyl-1-(p-methoxyphenyl)-3-phenyl - 3 - butenyl]phenoxy}ethyl}}pyrrolidine, obtained as described above as a pair of diastereoisomers, in 25 ml. of ether is treated with excess hydrogen chloride and the oily precipitate that forms is isolated and triturated with ether to give 1-{{2-{p-[2-ethyl-1-(p-methoxyphenyl)-3-phenyl - 3 - butenyl]phenoxy}ethyl}}pyrrolidine hydrochloride; M.P. 112–116° C., following crystallization from acetone-ether.

The 3-{α-(p-methoxyphenyl)-p-[2 - (1-pyrrolidinyl)-ethoxy]benzyl}-2 - phenylpentan-2-ol starting material is prepared as follows.

To a stirred solution of p-[2-(1-pyrrolidinyl)-ethoxy]-phenyl magnesium bromide, prepared as in Example 1 above from 19.5 g. of p-[2-(1-pyrrolidinyl)ethoxy]phenyl bromide and 2.8 g. of magnesium in 75 ml. of tetrahydrofuran, is added dropwise a solution of 15 g. of 2-(p-anisal)butyrophenone in 75 ml. of tetrahydrofuran, and the resulting mixture is heated under reflux for five hours, cooled, and treated carefully with 17 ml. of water. The precipitated solids are removed by filtration, washed with 100 ml. of tetrahydrofuran, and the combined filtrate and wash is evaporated under reduced pressure at 60° C. to remove solvent. The residue is treated with 250 ml. of methylene chloride and the mixture is filtered to remove insoluble solid. To the filtrate is added 500 ml. of ether and 150 ml. of 10% aqueous sodium hydroxide, the mixture is thoroughly shaken, and the organic phase is separated, washed with four 200-ml. portions of water, dried, and evaporated under reduced pressure. The oily residue is dissolved in a mixture consisting of 50 ml. of methylene chloride, 100 ml. of diethyl ether, and 100 ml. of petroleum ether, and the solution is poured onto a chromatography column prepared from 60 g. of basic alumina. The column is eluted first with petroleum ether-diethyl ether mixtures, then with diethyl ether, and finally with diethyl ether-methylene chloride mixtures. The desired product, 2 - {α-(p-methoxyphenyl)-p-[2-(1-pyrrolidinyl)ethoxy]benzyl}butyrophenone, is obtained upon evaporation of the petroleum ether-diethyl ether eluates; M.P. 91–105° C., mixture of diastereoisomers.

The individual diastereoisomeric free bases are obtained as follows. A solution of 10 g. of the mixture of diastereoisomeric 2 - {α-(p-methoxyphenyl)-p-[2 - (1-pyrrolidinyl)ethoxy]benzyl}butyrophenone free bases in 50 ml. of acetone is treated at room temperature with excess dry hydrogen chloride, the resulting mixture is diluted with an equal volume of ether, and the precipitated salt is isolated (M.P. 160–175° C.) and crystallized from acetone to give the high-melting isomer hydrochloride salt; M.P. 203–206° C. Additional high-melting isomer hydrochloride is obtained by treating the mother liquor from this crystallization with excess base, isolating the mixture of isomeric free bases that is liberated, treating again with hydrogen chloride, and crystallizing the salt from diethyl ether petroleum ether.

The hydrochloride salt of the high-melting isomer of 2-{α-(p-methoxyphenyl)-p-[2 - (1-pyrrolidinyl)ethoxy]-benzyl}butyrophenone is converted to the high-melting isomer free base by carefully neutralizing an aqueous solution of the hydrochloride salt, extracting with diethyl ether, evaporating the extract to dryness, and crystallizing the solid free base obtained from diethyl ether; M.P. 126–129° C.

A solution of 7.2 g. of the high-melting isomer obtained as described above in 100 ml. of tetrahydrofuran is added dropwise to a stirred mixture of 50 ml. of 3 M ethereal methyl magnesium bromide and 25 ml. of tertahydrofuran, and the resulting mixture is stirred and heated under reflux for 2 hours and then distilled to one-half volume over a period of 3 hours. Upon cooling, 60 ml. of tetrahydrofuran, 10 ml. of water, and 50 ml. of methylene chloride are successively added, and the mixture is filtered to remove the solids, which are washed with a mixture of 50 ml. of methylene chloride and 50 ml. of diethyl ether. The combined washings and filtrate are evaporated, and the residue is dissolved in a mixture of 100 ml. of diethyl ether and 100 ml. of methylene chloride. This solution is washed with 100 ml. of 5% aqueous sodium hydroxide and with four 50-ml. portions of water, dried and evaporated to give the desired 3-{α-(p-methoxyphenyl)-p-[2-(1-pyrrolidinyl)ethoxy]benzyl} - 2-phenylpentan-2-ol starting material, obtained as an oil that is suitable for use without further purification.

EXAMPLE 4

A mixture consisting of 2 g. of 3-{α-(p-methoxyphenyl)-p - [3 - dimethylamino)propoxy]benzyl} - 2 - phenylpentan-2-ol, 25 ml. of benzene, 8 ml. of water, 2 ml. of concentrated hydrochloric acid is evaporated to dryness at 100° C. at 10 mm. Hg, and the residue is heated at 215° C. for one hour while the pressure is maintained at 10 mm. Hg. Upon cooling, the residue is stirred with a small amount of petroleum ether and the mixture is poured onto a chromatography column prepared from 80 g. of alumina. The column is eluted successively with petroleum ether-diethyl ether mixtures, with diethyl ether, with diethyl ethermethylene chloride mixtures, and with methylene chloride. The diethyl ether-methylene chloride and methylene chloride eluates are combined and evaporated to dryness to give 3{p-[2-ethyl-1-(p-methoxyphenyl)-3-phenyl - 3 - butenyl]phenoxy}-N,N-dimethylpropylamine, obtained as an oil.

The 3-{α-(p-methoxyphenyl)-p-[3-(dimethylamino)-propoxy]benzyl}-2-phenylpentan-2-ol starting material is prepared as follows.

To a stirred solution of p-(2-tetrahydropyranyloxy) phenyl magnesium bromide (prepared from 42 g. of p-(2-tetrahydropyranyloxy)bromobenzene and 5 g. of magnesium in 200 ml. of anhydrous tetrahydrofuran) is carefully added a solution of 33 g. of 2-(p-anisal)butyrophenone in 50 ml. of tetrahydrofuran, and the resulting mixture is stirred at room temperature for 30 minutes and is then heated under reflux for 5 hours. Upon cooling, the reaction mixture is treated carefully with, in succession, 15 ml. of water, 15 ml. of tetrahydrofuran, and 50 ml. of methylene chloride, and, after thorough mixing, the liquid layer is decanted from the gel-like solid, which is washed with two 25-ml. portions of methylene chloride. The decanted liquid and washings are combined and evaporated under reduced pressure, and the oil obtained is dissolved in a mixture of 300 ml. of diethyl ether and 100 ml. of methylene chloride. The resulting solution is shaken with 100 ml. of 5% aqueous sodium hydroxide, washed with five 50-ml. portions of water, dried, and evaporated to give an oil, which is triturated with ether to give crystalline 2-{α-[p-(tetrahydropyranyloxy)phenyl]-p-methoxybenzyl}butyrophenone, M.P. 164–168° C., following several crystallizations from acetone.

The foregoing product (6.2 g.) is dissolved in 1800 ml. of methanol, 600 ml. of 2.5 N hydrochloric acid is added, and the resulting solution is kept at room temperature for 18 hours and then concentrated to remove methanol. The aqueous concentrate is extracted with 700 ml. of ether, and the ether solution is washed with four 50-ml. portions of water, dried, and evaporated to give 2-[α-(p-hydroxyphenyl)-p-methoxybenzyl]butyrophenone; M.P. 124–127° C., following crystallization from acetone-cyclohexane and drying under reduced pressure at 40° C. for one hour.

To a stirred mixture consisting of 0.14 g. of a 52% sodium hydride dispersion in mineral oil and 5 ml. of N,N-dimethylformamide is added a solution of 2 g. of 2 - [α - (p - hydroxyphenyl) -p - methoxybenzyl]butyrophenone in 10 ml. of N,N-dimethylformamide, and, after a short period, a solution of 0.73 g. of freshly distilled 3-dimethylaminopropyl chloride in 25 ml. of anhydrous diethyl ether. The resulting mixture is distilled until the temperature of the reaction mixture reaches 90° C., at which temperature it is stirred under reflux for 3 hours. Upon cooling, water (100 ml.) and ether (300 ml.) are added, the aqueous layer is made strongly alkaline with 10% aqueous sodium hydroxide, the mixture is thoroughly shaken, and the ethereal layer is separated, washed with five 50-ml. portions of water, dried, and evaporated to give 2-{α-(p-methoxyphenyl)-p-[3-(dimethylamino)propoxy]benzyl}butyrophenone; M.P. 112–113° C., following trituration with ether and crystallization from acetone-ether.

A solution of 1.9 g. of the foregoing product in 20 ml. of tetrahydrofuran is added to a mixture consisting of 25 ml. of 3 M ethereal methyl magnesium bromide and 20 ml. of tetrahydrofuran, and the resulting mixture is heated under reflux for three hours, cooled, and treated carefully with 20 ml. of 50% aqueous tetrahydrofuran and 50 ml. of methylene chloride. After stirring for one hour, the solids are separated by filtration, washed with 100 ml. of methylene chloride and 100 ml. of tetrahydrofuran, and the combined washings and filtrate are evaporated. The oil obtained is dissolved in a mixture of 400 ml. of ether and 200 ml. of methylene chloride, and the solution is thoroughly shaken with 100 ml. of 10% aqueous sodium hydroxide. The organic solution is separated, washed with four 50-ml. portions of water, dried, and evaporated to yield the desired 3-{α-(p-methoxyphenyl)-p - [3 - dimethylamino)propoxy]benzyl} - 2 -phenylpentan-2-ol starting material, obtained as an oil that is suitable for use without further purification.

EXAMPLE 5

Utilizing the procedure in Example 2 above, from the dehydration of the hydrochloride salt prepared from 5 g. of α-{α-ethyl-β-(p-methoxyphenyl)-p-[2-(1-pyrrolidinyl)ethoxy]phenethyl}benzyl alcohol and excess hydrochloric acid, there is obtained, after chromatography of the initial product as described in Example 3 above, 1-{{2-{p-[β - ethyl - α - (p - methoxyphenyl)cinnamyl]phenoxy}-ethyl}}pyrrolidine, isolated as a clear, colorless oil.

A mixture consisting of 500 mg. of the above free base, 250 mg. of citric acid monohydrate, and 25 ml. of acetone is heated on a steam bath for ten minutes, and the resulting solution is concentrated to half-volume and diluted with 25 ml. of ether to give 1-{{2-{p-[β-ethyl-α-(p-methoxyphenyl)cinnamyl]phenoxy}ethyl}}pyrrolidine mono-citrate monohydrate, M.P. 87–92° C.

The starting material is prepared as follows. A solution of 6 g. of 2-{α-(p-methoxyphenyl)-p-[2-(1-pyrrolidinyl)ethoxy]benzyl}butyrophenone (mixture of diastereoisomers, M.P. 91–105° C., prepared as described in Example 3 above) in 125 ml. of tetrahydrofuran is added dropwise to a stirred suspension of 3 g. of lithium aluminum hydride in 50 ml. of anhydrous ether, and the resulting mixture is heated under reflux for two hours. Upon cooling, the mixture is treated carefully with, in succession, 3 ml. of water, 3 ml. of 15% aqueous sodium hydroxide, and 9 ml. of water, the solid that precipitates is removed by filtration and washed with 50 ml. each of ether and methylene chloride, and the combined filtrate and washings are washed with water, dried, and evaporated to give the desired α-{α-ethyl - β - (p-methoxyphenyl)-p-[2-(1-pyrrolidinyl)ethoxy]phenethyl}benzyl alcohol starting material obtained as an oil that is suitable for use without further purification.

EXAMPLE 6

Utilizing the general reaction and isolation procedures described in the previous examples, from the dehydration of the hydrochloride salt prepared from 4.9 g. of 3-{α-(p - methoxyphenyl) - p - [3 - (1 - pyrrolidinyl)propoxy] benzyl}-2-phenylpentan-2-ol and excess hydrochloric acid there is obtained 1-{{3-{p-[2-ethyl-1-(p-methoxyphenyl)-3-phenyl-3-butenyl]phenoxy}propyl}}pyrrolidine; isolated as a colorless oil.

The starting material is prepared, utilizing procedures described earlier herein for analogous reactions, by first reacting 11 g. of 2-(p-anisal)butyrophenone and p-[3-(1 - pyrrolidinyl)propoxy]phenyl magnesium bromide (prepared from 14.2 g. of p-[3-(1-pyrrolidinyl)propoxy] phenyl bromide and 1.7 g. of magnesium) to give 2-{α-(p - methoxyphenyl) - p - [3 - (1 - pyrrolidinyl)propoxy] benzyl}butyrophenone, M.P. 125–129° C., and then reacting this intermediate (5 g.) with methyl magnesium bromide and hydrolyzing the reaction product to give the desired 3-{α-(p-methoxyphenyl) - p - [3-(1-pyrrolidinyl) propoxy]benzyl}-2-phenylpentan-2-ol starting material, obtained as an oil that is suitable for use without further purification.

EXAMPLE 7

Utilizing the general reaction and isolation procedures described in the previous examples, the following phenoxyalkylamine compounds are obtained as indicated below:

(a) From the dehydration of the hydrochloride salt of 4-{α-(p-methoxyphenyl) - p - [2-(1-pyrrolidinyl)ethoxy] benzyl}-3-phenylhexan-3-ol there is obtained a clear, colorless oil that is a mixture of 1-{{2-{p-[2-ethyl-1-(p-methoxyphenyl)-3-phenyl - 2 - pentenyl]phenoxy}ethyl}} pyrrolidine and the corresponding 3-pentenyl isomer.

(b) From the dehydration of the hydrochloride salt of 3-{α-p-methoxyphenyl) - p - [3-(1-pyrrolidinyl)propoxy] benzyl}-2-phenylhexan-2-ol there is obtained 1-{{3-{p[1-(p - methoxyphenyl) - 3 - phenyl-2-propyl-3-butenyl]phenoxy}propyl}}pyrrolidine, isolated as an oil that cannot readily be distilled without decomposition.

(c) From the dehydration of the hydrochloride salt of 3-{α-phenyl - p - [2-(1-pyrrolidinyl)ethoxy]benzyl}-2-(p-methoxyphenyl)pentan-2-ol there is obtained 1-{{2-{p-[2-ethyl-3-(p-methoxyphenyl)-1-phenyl - 3 - butenyl]phenoxy}ethyl}}pyrrolidine, isolated as a colorless oil that cannot readily be distilled without decomposition.

(d) From the dehydration of the hydrochloride salt of 3-{α-(p-methoxyphenyl) - p - [2-(dimethylamino)ethoxy] benzyl}-2-(p-methoxyphenyl)pentan-2-ol there is obtained 2-{p-[2-ethyl-1,3-bis(p-methoxyphenyl) - 3 - butenyl]phenoxy}-N,N-dimethylethylamine, isolated as an oil that cannot readily be distilled without decomposition.

(e) From the dehydration of the hydrochloride salt of 3-{α-(p-methoxyphenyl) - p - [2 - (diethylamino)ethoxy] benzyl}-2-(p-methoxyphenyl)pentan-2-ol there is obtained 2-{p-[2-ethyl-1,3-bis(p-methoxyphenyl) - 3 - butenyl]phenoxy}triethylamine, isolated as an oil that cannot readily be distilled without decomposition.

(f) From the dehydration of the hydrochloride salt of 2-(p-methoxyphenyl) - 3 - {α - (p - methoxyphenyl)-p-[2-

(1-pyrrolidinyl)ethoxy]benzyl}pentan-2-ol there is obtained 1-{{2-{p-[2-ethyl - 1,3 - bis(p - methoxyphenyl)-3-butenyl]phenoxy}ethyl}}pyrrolidine, isolated as an oil that cannot readily be distilled without decomposition.

(g) From the dehydration of the hydrochloride salt of 2-(p-methoxyphenyl) - 3 - {α - (p-methoxyphenyl)-p-[2-(1-pyrrolidinyl)ethoxy]benzyl}hexan-2-ol there is obtained a colorless oil that is a mixture of 1-{{2-{p-[1,3-bis(p-methoxyphenyl) - 2 - propyl - 2 - butenyl]phenoxy}ethyl}}pyrrolidine and the corresponding 3-butenyl isomer.

(h) From the dehydration of the hydrochloride salt of 2-benzyl - 1 - (p-methoxyphenyl)-1-{p-[2-(1-pyrrolidinyl)ethoxy]phenyl}butan-1-ol there is obtained 1-{{2-{p-[2-benzyl - 1 - (p-methoxyphenyl) - 1 - butenyl]phenoxy}ethyl}}pyrrolidine, isolated as a clear, colorless oil that cannot readily be distilled without decomposition.

The various starting materials named below, that are required for the preparation of the foregoing compounds, are prepared as described below.

(1) 4-{α-(p-methoxyphenyl) - p - [2-(1-pyrrolidinyl)ethoxy]benzyl}-3-phenylhexan-3-ol; obtained as an oil by reacting 2 - {α - (p-methoxyphenyl)-p-[2-(1-pyrrolidinyl)ethoxy]benzyl}butyrophenone with ethyl magnesium bromide and hydrolyzing the reaction product.

(2) 3-{α-(p-methoxyphenyl) - p - [3-(1-pyrrolidinyl)propoxy]benzyl}-2-phenylhexan-2-ol. p-Anisaldehyde and valerophenone are reacted in the presence of an equimolar amount of hydrogen chloride to give 2-(p-anisal)valerophenone, B.P. 188–194° C./0.6 mm. Hg, which in turn is reacted with p-[3-(1-pyrrolidinyl)propoxy]phenyl magnesium bromide to give, after hydrolysis, 2-{α-p-methoxyphenyl) - p - [3-(1-pyrrolidinyl)propoxy]benzyl}valerophenone, M.P. 98–106° C., which is converted to the desired starting material named above by reaction with methyl magnesium bromide and hydrolysis. The procedures used in these reactions are analogous to those described in (8) below for similar reactions.

(3) 3 - {α - phenyl - p - [2 - (1 - pyrrolidinyl)ethoxy]benzyl} - 2 - (p-methoxyphenyl)pentan-2-ol. 2-benzal-p-methoxybutyrophenone is reacted with p-[2-(1-pyrrolidinyl)ethoxy]phenyl magnesium bromide to give, after hydrolysis and chromatography on alumina, 2-{α-phenyl-p-[2-(1-pyrrolidinyl)ethoxy]benzyl} - p - methoxybutyrophenone, M.P. 82–110° C., which is further reacted with methyl magnesium bromide to give, following hydrolysis, the desired starting material named above.

(4) 3 - {α - (p-methoxyphenyl) - p - [2 - (dimethylamino)ethoxy]benzyl} - 2 - (p-methoxyphenyl)pentan-2-ol. 2-(p-anisal)-p-methoxybutyrophenone is reacted with p - [2 - (dimethylamino)ethoxy]phenyl magnesium bromide to give, following hydrolysis and chromatography on alumina, 2-{α-(p-methoxyphenyl) - p - [2-(dimethylamino)ethoxy]benzyl}-p-methoxybutyrophenone, which is converted to the desired starting material named above by reaction with methyl magnesium bromide and hydrolysis.

(5) 3-{α - (p-methoxyphenyl) - p - [2-(diethylamino)ethoxy]benzyl}-2-(p - methoxyphenyl)pentan-2-ol. 2-(p-anisal)-p-methoxybutyrophenone is reacted with p-[2-(diethylamino)ethoxy]phenyl magnesium bromide to give, following hydrolysis, 2-{α-(p-methoxyphenyl)-p-[2 - (diethylamino)ethoxy]benzyl} - p - methoxybutyrophenone, an oil that is converted to the desired starting material named above by reaction with methyl magnesium bromide and hydrolysis.

(6) 2-(p-methoxyphenyl) - 3 - {α-(p-methoxyphenyl)-p-[2 - (1 - pyrrolidinyl)ethoxy]benzyl}pentan-2-ol. 2-(p-anisal)-p-methoxybutyrophenone is reacted with p-[2-(1-pyrrolidinyl)ethoxy]phenyl magnesium bromide to give, following hydrolysis, p-methoxy-2-{α-(p-methoxyphenyl)-p-[2-(1-pyrrolidinyl)ethoxy]benzyl}butyrophenone, M.P. 78–103° C., which is further reacted with methyl magnesium bromide to give, following hydrolysis, the desired starting material.

(7) 2-(p-methoxyphenyl) - 3 - {α-(p-methoxyphenyl)-p-[2 - (1 - pyrrolidinyl)ethoxy]benzyl}hexan-2-ol. 2-(p-anisal)-p-methoxyvalerophenone is reacted with p-[2-(1-pyrrolidinyl)ethoxy]phenyl magnesium bromide to give, following hydrolysis and chromatography on alumina, 2-{α-(p-methoxyphenyl) - p - [2-(1-pyrrolidinyl)ethoxy]benzyl}-p-methoxyvalerophenone, obtained as an oil, which is converted to the desired starting material by reaction with methyl magnesium bromide and hydrolysis.

(8) 2-benzyl - 1 - (p-methoxyphenyl)-1-{p-[2-(1-pyrrolidinyl)ethoxy]phenyl}butan-1-ol.

To a stirred mixture consisting of 26.9 g. of benzaldehyde and 45 g. of p-methoxybutyrophenone, cooled to 0–5° C., is added 4.55 g. of hydrogen chloride, and the reaction mixture is stirred for 90 minutes at room temperature, kept overnight, heated on a steam bath for several hours, cooled, and then diluted with 150 ml. of benzene. The resulting solution is washed with two 100-ml. portions of water, dried, and evaporated to give 2-benzyl-p-methoxybutyrophenone; B.P. 190–195° C./0.4 mm. Hg.

A mixture consisting of 20 g. of 2-benzyl-p-methoxybutyrophenone, 3 g. of Raney nickel, and 200 ml. of methanol is shaken with hydrogen at a pressure of 50 lbs./in.$^2$ for 42 hours at room temperature. The mixture is then filtered to remove the catalyst, and the filtrate is evaporated. The oily residue obtained is purified by chromatography on a column prepared from 200 g. of alumina to give, upon elution with petroleum ether, with varying mixtures of petroleum ether and diethyl ether, and with diethyl ether, 2-benzyl-p-methoxybutyrophenone.

A solution of 16.5 g. of 2-benzyl-p-methoxybutyrophenone in 100 ml. of tetrahydrofuran is added dropwise to a stirred solution of p-[2-(1-pyrrolidinyl)ethoxy] phenyl magnesium bromide (prepared from 20.8 g. of p-[2-(1-pyrrolidinyl)ethoxy]phenyl bromide and 1.9 g. of magnesium in 100 ml. of tetrahydrofuran), and the resulting mixture is heated under reflux for five hours. Upon cooling, the mixture is treated carefully with 10 ml. of water, filtered, and the isolated solid washed with 100 ml. of methylene chloride. The combined washings and filtrate are evaporated, the oil residue is dissolved in 300 ml. of methylene chloride, and the solution is washed with three 75-ml. portions of water, dried and evaporated to give 2-benzyl-1-(p-methoxyphenyl)-1-{p-[2-(1-pyrrolidinyl)ethoxy]phenyl}butan-1-ol, which is further purified by chromatography on alumina.

EXAMPLE 8

A mixture of 1-{{2-{p-[2-ethyl-1-(p-methoxyphenyl)-3-phenyl-2-butenyl]phenoxy}ethyl}}pyrrolidine and the corresponding 3-butenyl isomer (1.73 g.; prepared as described in Example 3 above) is dissolved in 75 ml. of glacial acetic acid, 200 mg. of platinum oxide is added, and the resulting mixture is shaken at room temperature with hydrogen at an initial pressure of 50 lbs./in.$^2$ until one molecular equivalent of hydrogen is taken up (about one hour). The catalyst is removed by filtration, washed with acetic acid, and the combined filtrate and washings are evaporated under reduced pressure at 60° C. The residue is dissolved in 200 ml. of ether, and the ethereal solution is washed well, first with 5% aqueous sodium hydroxide, then with three 25-ml. portions of water, dried, and evaporated. The oily residue is dissolved in a small amount of petroleum ether-diethyl ether, and the solution is poured onto a chromatography column prepared from 40 g. of alumina. Elution of the column with a 1:1 mixture of petroleum ether-diethyl ether gives 1-{{2-{p-[2 - ethyl - 1 - (p-methoxyphenyl)-3-phenylbutyl]phenoxy}ethyl}}pyrrolidine, isolated as a clear, colorless oil that cannot be readily distilled without decomposition. Elution of the same alumina column with diethyl ether gives an additional amount of oily product having a slightly different diastereoisomeric composition.

A mixture consisting of 1.4 g. of the above free base product, 0.7 g. of citric acid monohydrate, and 75 ml. of acetone is heated on a steam bath for 10 minutes, and the resulting solution is concentrated to a volume of 10 ml. and diluted with 25 ml. of ether to give 1-{{2-{p-[2-ethyl - 1 - (p-methoxyphenyl) - 3-phenylbutyl]phenoxy} ethyl}}pyrrolidine monocitrate monohydrate; M.P. 90–93° C., following crystallization from ether.

EXAMPLE 9

Utilizing procedures analogous to that described in Example 8 above, including purification by chromatography on alumina, the following phenoxyalkylamine compounds are obtained from the hydrogenation of the designated olefin starting material in the presence of platinum oxide:

(a) From the hydrogenation of 3-{p-[2-ethyl-1-(p-methoxyphenyl) - 3 - phenyl - 3 - butenyl]phenoxy}-N,N-dimethylpropylamine there is obtained 3-{p-[3-phenyl-2-ethyl-1-(p-methoxyphenyl)butyl]phenoxy} - N,N - dimethylpropylamine, isolated as an oil that cannot readily be distilled without decomposition.

(b) From the hydrogenation of 1-{{2-{p-[2-ethyl-1,3-bis(p-methoxyphenyl) - 3 - butenyl]phenoxy}ethyl}}pyrrolidine there is obtained 1 - {{2 - {p - [2-ethyl - 1,3-bis (p - methoxyphenyl)butyl]phenoxy}ethyl}}pyrrolidine, isolated as a colorless oil that cannot readily be distilled without decomposition.

(c) From the hydrogenation of 1-{{2-{p-[2-ethyl-1-(p - methoxyphenyl - 3 - phenyl - 2 - pentenyl]phenoxy} ethyl}}pyrrolidine or of the corresponding 3-pentenyl isomer or of a mixture of the two olefin isomers, there is obtained 1 - {{2 - {p - [2-ethyl-1-(p-methoxyphenyl)-3-phenylpentyl]phenoxy}ethyl}}pyrrolidine.

EXAMPLE 10

A mixture consisting of 2 g. of 2-{α-(p-methoxyphenyl) - p - [2 - (1 - pyrrolidinyl)ethoxy]benzyl}butyrophenone (mixture of diastereoisomers, M.P. 91–105° C., prepared as described in Example 3 above), 0.5 g. of 20% palladium-on-carbon, 0.6 ml. of concentrated sulfuric acid, and 75 ml. of methanol is shaken at room temperature with hydrogen at an initial pressure of 50 lbs./in.² until two molecular equivalents of hydrogen are taken up (about 20 hours). The catalyst is removed by filtration, washed with methanol, and the combined filtrate and washings are made alkaline with 2% methanolic sodium hydroxide and evaporated. The residue is dissolved in a mixture of 200 ml. of methylene chloride and 200 ml. of diethyl ether, and the solution is mixed with 200 ml. of water, separated, washed with four 50-ml. portions of water, dried, and evaporated to give 1-{{2-{p-[2-benzyl-1 - (p - methoxyphenyl)butyl]phenoxyethyl}}pyrrolidine, isolated as an oil that cannot readily be distilled without decomposition.

A mixture consisting of 1.7 g. of the above free base product, 900 mg. of citric acid monohydrate, and 50 ml. of acetone is heated on a steam bath for 30 minutes, concentrated to about 10 ml. under reduced pressure, and diluted with several volumes of diethyl ether to give 1 - {{2 - {p - [2 - benzyl - 1 - (p-methoxyphenyl)butyl] phenoxy}ethyl}}pyrrolidine monocitrate, which is isolated by filtration and dried; M.P. 88–92° C.

What is claimed is:
1. 1 - {{3 - {p - [2 - ethyl - 1 - (p-methoxyphenyl)-3-phenyl-3-butenyl]phenoxy}propyl}}pyrrolidine.
2. 1 - {{2 - {p - [2 - ethyl-1,3-bis(p-methoxyphenyl)-3-butenyl]phenoxy}ethyl}}pyrrolidine.
3. 1 - {{3 - {p - [1 - (p-methoxyphenyl)-3-phenyl-2-propyl-3-butenyl]phenoxy}propyl}}pyrrolidine.
4. 1 - {{2 - {p-[2-ethyl-1-(p-methoxyphenyl)-3-phenylbutyl]phenoxy}ethyl}}pyrrolidine.
5. 3 - {p - [3 - phenyl - 2 - ethyl-1-(p-methoxyphenyl butyl]phenoxy}-N,N-dimethylpropylamine.

References Cited
UNITED STATES PATENTS 2,796,435  6/1957  Goldberg et al. ____ 260—570.7
3,075,014  1/1963  Palopoli et al. _____ 260—570.7

ALEX MAZEL, Primary Examiner

B. I. DENTZ, Assistant Examiner

U.S. Cl. X.R.
260—570.7, 999